Patented Oct. 18, 1932

1,883,189

UNITED STATES PATENT OFFICE

MORRIS L. WEISS, OF NEWARK, AND CARLETON P. BARDSLEY, OF SOUTH ORANGE, NEW JERSEY, ASSIGNORS, BY MESNE ASSIGNMENTS, TO THE DOW CHEMICAL COMPANY, OF MIDLAND, MICHIGAN, A CORPORATION OF MICHIGAN

METHOD OF MAKING DIARYLGUANIDINES

No Drawing.   Application filed July 23, 1928.   Serial No. 294,934.

The present invention relates to the production of diarylguanidines by the interaction of cyanogen chloride and primary aromatic amines, and more particularly to the production of diphenylguanidine from cyanogen chloride and aniline.

It is well known that Hofmann as long ago as 1848 (see Annalen 67, 129) prepared diphenylguanidine (or melanilin as he named it) by passing the vapor of cyanogen chloride into dry aniline. However, he found that the presence of moisture led to the production of an impurity and lowered yields of the principal product, and further that when a solution obtained by treating aqueous hydrocyanic acid with chlorine was employed as the source of cyanogen chloride in the reaction, only a small yield of the diphenylguanidine was obtained. Consequently he concluded that the presence of water was to be avoided and the reaction should be carried out under substantially anhydrous conditions.

Quite recently it has been proposed to produce diphenylguanidine by treating aniline with liquid cyanogen chloride (or bromide) in the presence of water, the conditions under which the reaction can be carried out being given in a paper by Naunton (Jour. Soc. Chem. Ind. 45, 376T), also in U. S. Patents 1,639,724 and 1,639,725 to Cronshaw and Naunton. While they mention liquid cyanogen chloride, they prefer to utilize the bromide, because being much less volatile than the chloride, its poisonous action is not so dangerous and it is more easily handled and maintained in a liquid condition.

Obviously cyanogen bromide is much more costly than the chloride, and its use adds greatly to the expense of operating the process. It is, therefore, desirable to employ the cheaper material, if means can be found to overcome the aforementioned difficulties.

We have discovered that cyanogen chloride can be safely and economically produced in the same vessel in which it is subsequently reacted with a primary aromatic amine, or amines, for the production of a diarylguanidine, if the reaction is carried out in the neighborhood of 0° C. in an aqueous medium, such as a salt brine, which will not freeze at the temperature of the reaction, and in which the cyanogen chloride product, contrary to Cronshaw and Naunton, remains substantially dissolved. In other words, we do entirely away with the separate preparation of such cyanogen chloride. At the same time, when carried out according to the detailed procedure hereinafter fully disclosed, a product of high purity is obtained in substantially theoretical yield. It is apparent, therefore, that our invention constitutes an important advance in the art of making diphenylguanidine and related diarylguanidines, so that these compounds, so essential to the rubber industry, can be produced at a lower cost than by any process hitherto known.

To the accomplishment of the foregoing and related ends the invention, then, consists of the steps hereinafter fully described and particularly pointed out in the claims, the following description setting forth but one of the various ways in which the principle of the invention may be used.

Our process is distinguished by the fact that the several steps may be carried out in one tightly enclosed vessel, thereby preventing the escape of poisonous vapors into the room and obviating all danger that would arise in the transferring a volatile material of the poisonous nature of cyanogen chloride, as well as the expense of the additional steps of separating and purifying such cyanogen chloride before it is reacted with aniline, which are connected with previously known processes.

Furthermore, by reacting in a salt solution, or brine, at a temperature below the freezing point of water, upon the introduction of chlorine a copious precipitate of chlorine hydrate is formed, with which a solution of sodium cyanide reacts to produce a relatively concentrated solution of cyanogen chloride without any liquid cyanogen chloride separating out. An excess of chlorine is readily maintained throughout the reaction mixture by suitable agitation, the mixture being fluid and mobile at the low temperature due to the use of a brine, thereby preventing the formation of dark-colored addition compounds of cyanogen chloride and sodium cyanide which would arise whenever an excess, even momentarily, of sodium cyanide should be present. Such compounds, if formed, are most objectionable in reducing the yield and discoloring the product.

By way of illustration, the manufacture of diphenylguanidine is described in detail, but it will be understood that our improved process is equally adaptable to the preparation of other diarylguanidines.

Approximately 325 gallons of an approximately 8 per cent. common salt (NaCl) solution is introduced into a tightly closed vessel equipped with an agitator, and the temperature brought to from 0° to −5° C., preferably to about −2° C., by any suitable cooling means. While agitating and cooling, approximately 50 pounds of chlorine is passed into such solution at such a rate that substantially all of it is converted into the crystalline chlorine hydrate. While in practice we prefer the temperature as stated for this stage of the process, so as to promote the formation of chlorine hydrate crystals and prevent the escape of cyanogen chloride vapors, the subsequent reaction can be conducted at somewhat higher temperatures, but should at all times be kept well below the boiling point of cyanogen chloride, i. e., 15° C. Thereupon an aqueous solution of sodium cyanide is gradually added, while the introduction of chlorine is continued, care being taken that an excess of chlorine is always present. When 350 pounds of chlorine has been passed in, further addition of chlorine is stopped, and the addition of the sodium cyanide solution is continued until all of the chlorine has been exactly consumed, which will require so much of such solution as contains 242 pounds of sodium cyanide. No excess of cyanide solution is used and a relatively concentrated, perfect solution of cyanogen chloride in salt water is obtained.

A slight excess over the theoretical amount of aniline, which is 2 molecules for each molecule of cyanogen chloride, or about 955 pounds, is then added, with agitation, and the temperature allowed to rise to about 10° C., thereby permitting the aniline to be introduced more rapidly. The reaction soon starts after the addition of aniline is begun, with the formation of cyan-anilide and aniline hydrochloride according to the equation:—

$$2C_6H_5NH_2 + CNCl \rightarrow C_6H_5.NH.CN + C_6H_5.NH_2.HCl,$$

and is completed directly after all of the aniline has been added.

The reaction mixture is next brought to a boil and boiled under a slight pressure, about 10 pounds above atmospheric, at a temperature of about 101° C. for several hours. Condensation occurs with the formation of the hydrochloric acid salt of diphenylguanidine, according to the equation:—

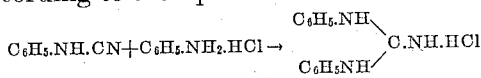

The hot solution is then diluted to about 5 per cent. content of the product and run into a caustic soda solution with agitation, whereupon diphenylguanidine is precipitated. The latter, constituting the desired product, is obtained in a state of high purity and in substantially theoretical yield.

In a like manner, our process may be used to produce homologous diarylguanidines by substituting other primary aromatic amines for aniline, as, for example, diorthotolylguanidine from otho-toluidine, and phenylortho-tolylguanidine from a mixture of aniline and orthotoluidine in molecular proportion. The process, therefore, is not limited to the preparation of diphenylguanidine, but includes the combination of cyanogen chloride with any primary aromatic amine or a mixture in molecular proportion of two such amines for the production of the corresponding diarylguanidines.

Instead of a brine composed of a solution of sodium chloride, or common salt, we may use a solution of potassium chloride, in which case it is preferable to add a solution of potassium, instead of sodium, cyanide in the step wherein cyanogen chloride is produced. In the following claims it is understood that the term "brine" includes any suitable salt solution.

Other modes of applying the principle of the invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of making a diarylguanidine, the steps which consist in passing chlorine into a brine at a temperature of about 0° C. so that a precipitate of chlorine hydrate crystals is produced therein, thereupon adding a solution of an alkali metal cyanide in amount not exceeding that theoretically required to react with all such chlorine present, whereby a solution of cyanogen chloride is formed, and then adding a primary aromatic amine of the benzene series to such solution.

2. In a method of making diphenylguanidine, the steps which consist in passing chlorine into a brine at a temperature of about 0° C. so that a precipitate of chlorine hydrate crystals is produced therein, thereupon adding a solution of an alkali metal cyanide in amount not exceeding that theoretically required to react with all such chlorine present, whereby a solution of cyanogen chloride is formed, and then adding aniline to such solution.

3. In a method of making diphenylguanidine, the steps which consist in passing chlorine into an approximately 8 per cent sodium chloride brine at a temperature between about 0° and about −5° C. so that a precipitate of chlorine hydrate crystals is produced therein, thereupon adding a solution of sodium cyanide while continuing the introduction of chlorine so that an excess of chlorine is constantly maintained until sufficient cyanide has been added to react with all of the chlorine present, whereby a brine solution of cyanogen chloride is formed, and then adding aniline to such solution.

Signed by us, this 16th day of July, 1928.
MORRIS L. WEISS.
CARLETON P. BARDSLEY.